(12) United States Patent
Tanaka et al.

(10) Patent No.: US 7,046,877 B2
(45) Date of Patent: May 16, 2006

(54) OPTICAL MODULE

(75) Inventors: Hiroyuki Tanaka, Osaka (JP); Takeshi Ishimaru, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 70 days.

(21) Appl. No.: 10/703,871

(22) Filed: Nov. 7, 2003

(65) Prior Publication Data

US 2004/0091210 A1    May 13, 2004

(30) Foreign Application Priority Data

Nov. 11, 2002    (JP) ............................. 2002-327137

(51) Int. Cl.
*G02B 6/32*    (2006.01)

(52) U.S. Cl. ............................. 385/34; 385/31; 385/33; 385/46; 385/47

(58) Field of Classification Search ................ 385/34, 385/44, 46, 47, 33
See application file for complete search history.

(56) References Cited

U.S. PATENT DOCUMENTS

| | | | |
|---|---|---|---|
| 6,023,542 A * | 2/2000 | Pan et al. ...................... 385/24 |
| 6,404,954 B1 * | 6/2002 | Zhu et al. ...................... 385/34 |
| 6,582,135 B1 * | 6/2003 | Brun et al. .................... 385/78 |
| 2003/0185513 A1 * | 10/2003 | Hellman et al. ............... 385/47 |

FOREIGN PATENT DOCUMENTS

| JP | 408054537 | * 2/1996 |
|---|---|---|
| JP | 2003240960 | 8/2003 |

* cited by examiner

*Primary Examiner*—Michelle Connelly-Cushwa
*Assistant Examiner*—James D. Stein
(74) *Attorney, Agent, or Firm*—Boyle Fredrickson Newholm Stein & Gratz S.C.

(57) ABSTRACT

An optical module has first and second optical parts. Each of the optical parts has an optical path extending in a longitudinal direction and an end face intersecting the optical path. The end face of the first optical part faces the end face of the second optical part. Light enters the end face of the second optical part from the end face of the first optical part. An adhesive forms a joint for connecting the end faces of the parts to each other in peripheral portions about the optical paths of the parts.

17 Claims, 6 Drawing Sheets

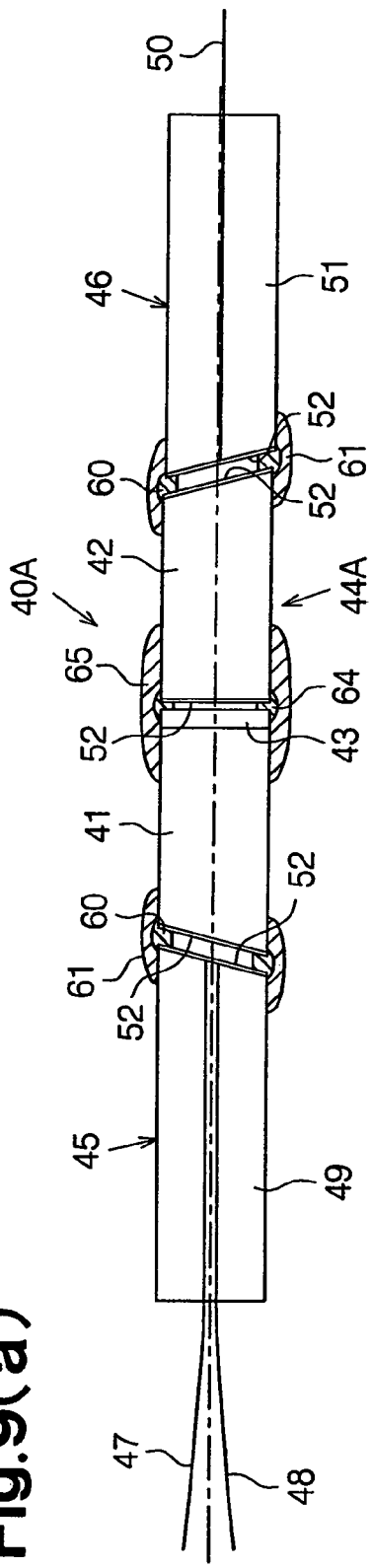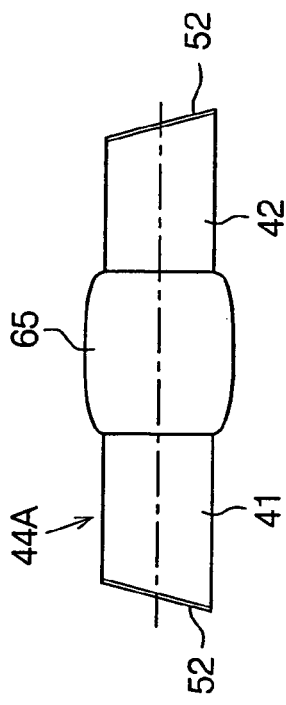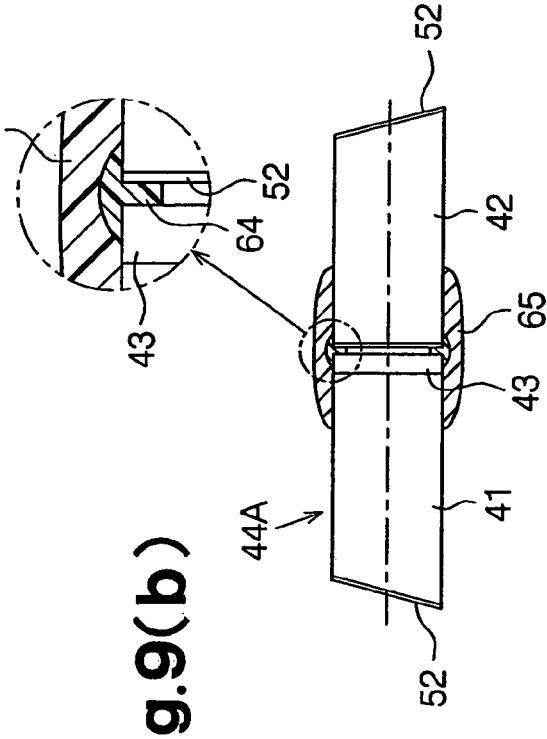

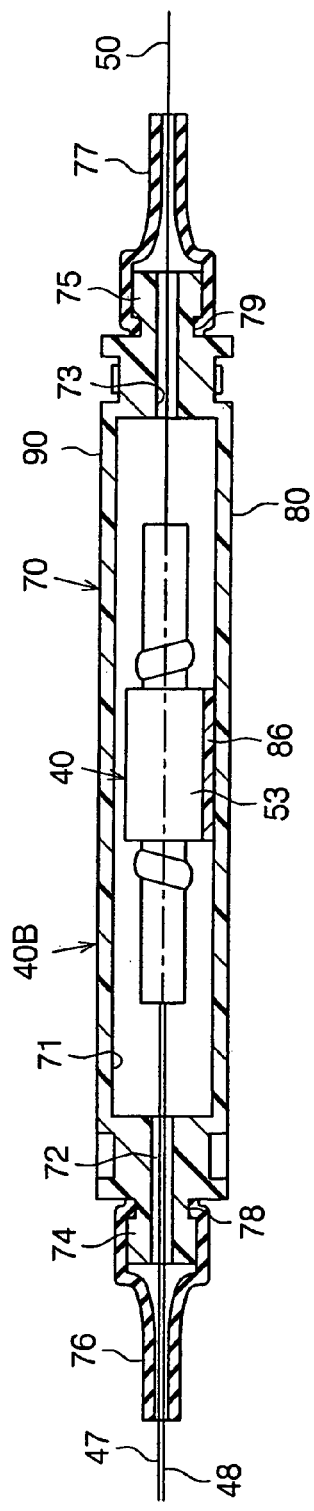
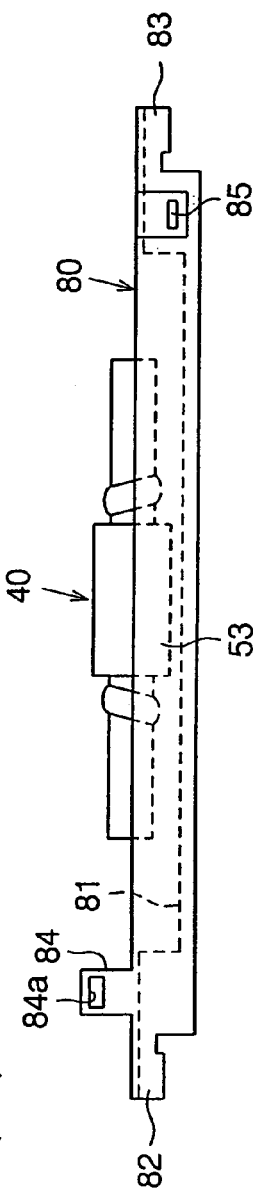
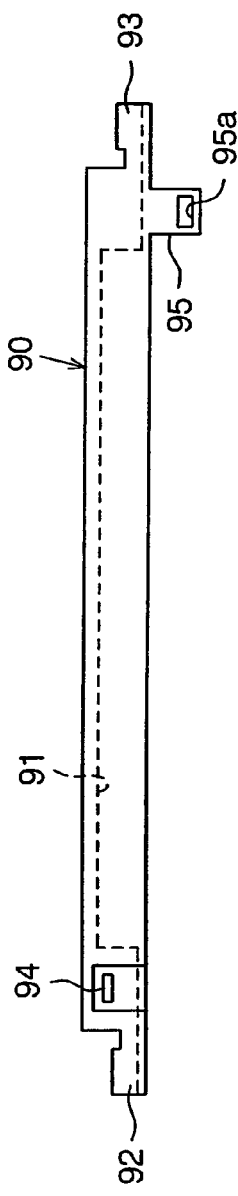
Fig.10(a)
Fig.10(b)
Fig.10(c)

OPTICAL MODULE

BACKGROUND OF THE INVENTION

The present invention relates to an optical module used in an optical device such as an optical multiplexer, an optical demultiplexer, and an optical multiplexer/demultiplexer used in an optical communication system based on a wavelength division multiplexing (WDM) transmission modes such as a dense wavelength division multiplexing (DWDM) transmission mode and a coarse wavelength division multiplexing (CWDM) transmission mode.

Three-port filter modules such as a filter module 20 shown in FIG. 13 have been conventionally used as optical modules. The filter module 20 has first and second optical fiber collimators 21, 22. The first collimator 21 has a first gradient index rod lens 23, and the second collimator 22 has a second gradient index rod lens 24. A wavelength selective interference film 25 is provided between the first and second rod lenses 23, 24.

The first optical fiber collimator 21 includes the first rod lens 23 and a single-core capillary 27 having a single mode optical fiber 26. The optical fiber 26 and the single-core capillary 27 form a single optical fiber chip 31.

The second optical fiber collimator 22 includes the second rod lens 24 and a dual core-capillary 30 having two optical fibers 28, 29. The optical fibers 28, 29 and the dual-core capillary 30 form a dual optical fiber chip 32.

The first and second rod lenses 23, 24 of the first and second optical fiber collimators 21, 22 are coaxially arranged in the filter module 20 to form an integral center piece 33. The filter module 20 is manufactured by aligning optical fiber chips 31, 32 relative to the center piece 33 and fixing the chips 31, 32 to the center piece 33. That is, the center piece 33, with which the first and second rod lenses 23, 24 are coaxially integrated, is first assembled. Then, the optical fiber chips 31, 32 are aligned with and fixed to the center piece 33 to form the filter module 20.

Therefore, alignment and fixing must be performed only twice for aligning and fixing each of the optical fiber chips 31, 32 to the center piece 33. This shortens the time required for assembly, and thus reduces the cost. Also, since the number of parts is reduced, inexpensive and highly reliable filter modules are produced.

In the above described filter module 20, the optical fiber chips 32, 31 are adhered to the center piece 33. The following is an example of adhering methods.

When aligning and fixing the optical fiber chip 32 to the rod lens 24 of the center piece 33, inclined faces of the rod lens 24 and the dual-core capillary 30 are placed parallel to face each other. Optical adhesive 35 having a predetermined refractive index is applied to penetrate the space between the rod lens 24 and the capillary 30. The adhesive 35 is hardened to bond the rod lens 24 and the capillary 30 to each other. Then, reinforcing adhesive 36 is applied to cover the circumference of the optical adhesive 35 and is hardened. Thereafter, with the same procedure, the optical fiber chip 31 is aligned with and fixed to the rod lens 23 of the center piece 33.

Since such a bonding process is performed, the optical adhesive 35 exists in the optical paths between the optical fibers 28, 29 and the rod lens 24 and in the path between the optical fiber 26 and the rod lens 23.

Even if the optical adhesive 35 has a transparency, the transmittance of the adhesive is not be 100% in the entire usable range of temperatures of the filter module 20, for example, in a range from 0 to 70° C. Also, troubles in the boding process or improper maintenance cause foreign matter and bubbles to enter the optical adhesive 35. In such a case, the optical adhesive 35 in the optical paths is an impediment to light. No significant drawbacks exist when optical signals of low optical power, for example, signals of several milliwatts, are used. However, using light signals of high optical power, for example, signals of several hundreds of milliwatts produces heat and thus damages the optical adhesive 35. This may decrease the performance.

Therefore, in optical communications systems, conventional filter modules cannot be used in apparatuses and lines in which optical signals of a high optical power are used. That is, conventional filter modules can only be applicable to apparatuses and lines in which optical signals of a high optical power are not used. For example, there is a possibility that the conventional filter modules cannot be applied to lines of optical communications systems in which optical signals of high optical power, for example, optical signals of several watts are used, specifically, in a system where pump light for an optical amplifier is used.

SUMMARY OF THE INVENTION

Accordingly, it is an objective of the present invention to provide an optical module that has no adhesive in optical paths and is applicable to apparatuses in a optical communications system using optical signals of a high power, and to lines for conveying amplifying pump lights having a high power.

To achieve the foregoing and other objectives and in accordance with the purpose of the present invention, an optical module having first and second optical parts, and an adhesive is provided. Each of the first and second optical parts has an optical path extending in a longitudinal direction and an end face intersecting the optical path. The end face of the first optical part faces the end face of the second optical part. Light enters the end face of the second optical part from the end face of the first optical part. The adhesive forms a joint for connecting the end faces of the parts to each other in peripheral portions about the optical paths of the parts.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9(a) is a schematic view showing an optical module according to a second embodiment;

FIG. 9(b) is a schematic view showing the center piece of the optical module shown in FIG. 9(a);

FIG. 9(c) is a partially enlarged cross-sectional view showing the center piece of FIG. 9(b);

FIG. 9(d) is a side view showing the appearance of the center piece of FIG. 9(b);

FIG. 10(a) is a cross-sectional view showing an optical module according to a third embodiment;

FIG. 10(b) is a side view showing a lower half of the housing to which the main body of the optical module is fixed;

FIG. 10(c) is a side view showing the upper half of the housing;

DETAILED DESCRIPTION OF THE PREFERRED EMBODIMENTS

Figure 1:
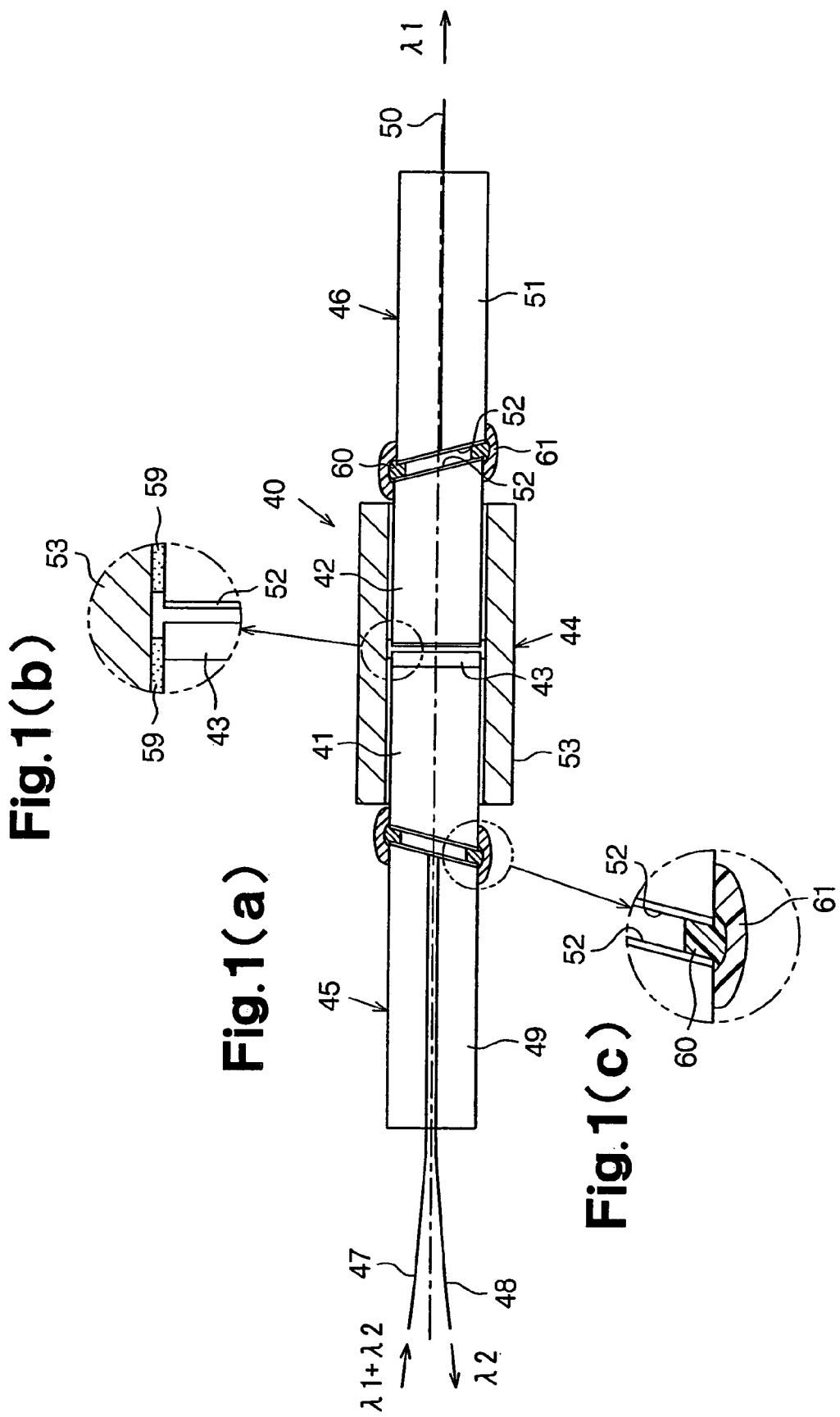
FIG. 1(a) is a schematic view showing an optical module according to a first embodiment.
FIG. 1(b) is an enlarged partial cross-sectional view shoring a joint of the optical module of FIG. 1(a)
FIG. 1(c) is an enlarged partial cross-sectional view shoring another joint of the optical module of FIG. 1(a)

First to third embodiments of the present invention will now be described with reference to the drawings. Throughout the description, the same or like components have the same reference numbers in all embodiments.

FIGS. 1(a), 1(b), and 1(c) illustrate an optical module 40 according to a first embodiment.

The optical module 40 is a three-port filter module having a center piece 44 and two optical fiber chips 45, 46. The center piece 44 has two gradient index rod lenses 41, 42 and a filter located between the lenses 41, 42. The filter is a wavelength selective interference film 43 and is coaxial with the lenses 41, 42. The optical module 40 is formed by aligning the first and second optical fiber chips 45, 46 relative to the first and second rod lenses 41, 42 of the center piece 44, and then fixing the fiber chips 45, 46 to the rod lenses 41, 42.

The first rod lens 41 and the dual optical fiber chip 45 form a dual optical fiber collimator. The second rod lens 42 and the single optical fiber chip 46 form a single optical fiber collimator.

The dual optical fiber chip 45 includes two single mode optical fibers (hereinafter referred to as first and second optical fibers), and a dual-core capillary 49 for holding the first and second optical fibers 47, 48. On the other hand, the single optical fiber chip 46 has a single optical fiber 50 and a single-core capillary 51 for holding the optical fiber 50.

One endface of the first rod lens 41 (right endface as viewed in FIG. 1(a)) is polished to be an endface that is perpendicular to the optical axis. The left endface of the rod lens 41 is polished to be an endface that is inclined relative to a plane perpendicular to the optical axis by a predetermined angle (for example, eight degrees). The second rod lens 42 is identical with the first rod lens 41.

The diameter of the first and second rod lenses 41, 42 is, for example, 1.8 mm, and the length of the lenses 41, 42 is, for example, 0.245 pitch. The pitch refers to the sinusoidal period of a light ray traveling in a gradient index rod lens. A wavelength selective interference film 43 is formed on the endface of the rod lens 41. The interference film 43 is a dielectric film having a wavelength selecting property. The interference film 43 is an edge filter that, in the light wavelength region used in the conventional optical communications, transmits all the light rays in a wavelength band about 1.55 µm, and reflects all the light in the wavelength band about 1.48 µm. The light rays in the wavelength band about 1.55 µm are light rays in a wavelength region λ1 ranging from 1.53 to 1.58 µm. The light rays in the wavelength band about 1.48 µm are light rays in a wavelength region λ2 ranging from 1.45 to 1.49 µm. The wavelength selective interference film 43 may be a bandpass filter that transmits or reflects the light rays in a particular wavelength band ranging from a few nanometers to a few tens of nanometers falling in the light wavelength region used in the conventional optical communications.

The radiating ends of the optical fibers 47, 48 and the right end of the dual-core capillary 49 are polished to be a flush inclined face that is inclined (for example, by eight degrees) relative to a plane perpendicular to the core axis of each of the optical fibers 47, 48. The radiating end of the optical fiber 50 and the left end of the single-core capillary 51 are polished to be a flush inclined face that is inclined (for example, by eight degrees) relative to a plane perpendicular to the core axis of the optical fiber 50.

The dual optical fiber chip 45 is aligned with and fixed to the center piece 44 such that the inclined face of the dual-core capillary 49 and the inclined face of the rod lens 41 are face each other in parallel. Likewise, the single optical fiber chip 46 is aligned with and fixed to the center piece 44 such that the inclined face of the single-core capillary 51 and the inclined face of the rod lens 42 are face each other in parallel.

An antireflection film 52 is formed on each of the inclined face of the rod lens 41, the inclined face of the dual-core capillary 49, the left endface of the rod lens 42, the inclined face of the rod lens 42, and the inclined face of the single-core capillary 51. The antireflection film 52 has a property to reduce the reflectivity to a predetermined wavelength (1.55 µm) in a usable wavelength region to a value equal to or less than a predetermined value (for example, 0.2%).

The wavelength selective interference film 43 may be formed on either one of the facing endfaces of the rod lenses 41, 42. However, if the length of the rod lenses 41, 42 is equal to or less than 0.245 pitch, it is more reasonable to form the film 43 on the endface of the rod lens 42.

The center piece 44 is formed by fixing the two rod lenses 41, 42 to the inner surface of a cylindrical lens holder 53, such that the rod lenses 41, 42 are coaxial and the endfaces face each other with the wavelength selective interference film 43 in between.

The inner surface of the lens holder 53 is accurately machined to coaxially hold the rod lenses 41, 42. Therefore, the axes of the rod lenses 41, 42 are aligned simply by inserting the rod lenses in the lens holder 53. To facilitate adjusting of the positions of the rod lenses 41, 42 in the lens holder 53 for creating a predetermined lens distance, indications, such as markings, are preferably provided on the rod lenses 41, 42 and on the lens holder 53.

In the optical module 40 of this embodiment, the inclined face of the rod lens 41 and the inclined face of the dual-core capillary 49 (end face of the first optical fiber chip) are fixed by adhesive 60 at a peripheral portion that is outward of a center portion forming an optical path. Likewise, the inclined face of the rod lens 42 and the inclined face of the single-core capillary 51 (end face of the second optical fiber chip) are fixed by the adhesive 60 at a peripheral portion that is outward of a center portion forming an optical path. A layer of air exists inward of the adhesive 60.

If the diameter of the rod lenses 41, 42 is, for example, 1.8 mm, the adhesive 60 is preferably applied such that the adhesive does not enter a region of a radius 0.5 mm from the center of the lenses 41, 42, that is, such that an inner diameter D of the adhesive 60 is more than 1.0 mm (0.5×2 mm).

Further, the joint of the rod lens 41 and the dual-core capillary 49, which are fixed with the adhesive 60, and the joint between the rod lens 42 and the single-core capillary 51, which are fixed with the adhesive 60, are reinforced with adhesive 61 applied to cover the entire circumference of the adhesive 60.

As the adhesive 60, an ultraviolet curing adhesive or a visible light curing adhesive high in viscosity is used. Accordingly, the adhesive 60 does not penetrate into the center when applied to the peripheral portion. As the reinforcing adhesive 61, a thermosetting epoxy adhesive is used.

An assembly procedure of the optical module 40 will now be described with reference to FIGS. 2 to 8.

Figure 2:
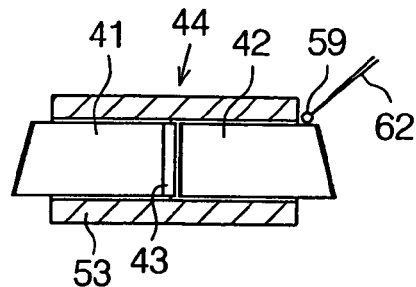
FIG. 2 is a schematic view showing a process step 1 for assembling an optical module.

In process step 1, the center piece 44 shown in FIG. 2 is assembled.

First, the first and second rod lenses 41, 42 are inserted in the lens holder 53 such that the wavelength selective interference film 43 and the endface of the second rod lens 42 face each other at a predetermined distance as shown in FIG. 2. At this time, the phases of the inclined faces of the first and second rod lenses 41, 42 are matched. To accurately match the phases, a referential marking (not shown) is preferably provided on the circumference of each of the rod lenses 41, 42.

Thereafter, a small amount of the adhesive 59 is scooped with a micro spatula 62 and applied to the space between the lens holder 53 and each of the first and second rod lenses 41, 42. At this time, the adhesive 59 is prevented from entering the space between the first and second rod lenses 41, 42 (see FIGS. 1(a) and 1(b)). When the adhesive 59 is hardened, the first and second rod lenses 41, 42 are fixed to the lens holder 53, and the center piece 44 is completed.

Figure 3:
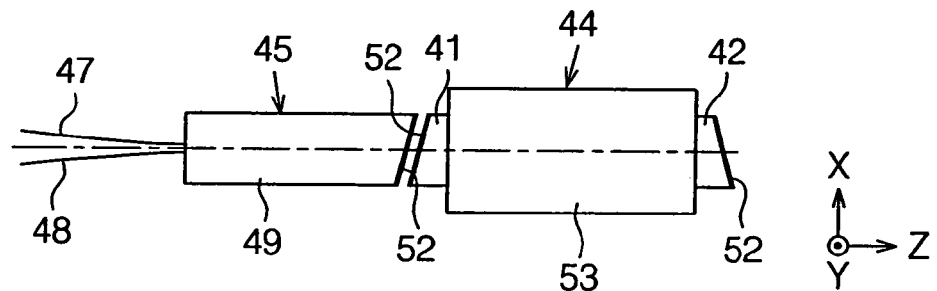
FIG. 3 is a schematic view showing a process step 2 for assembling the optical module.

In process step 2, the dual optical fiber chip 45 is aligned as shown in FIG. 3, on an aligning device, relative to the rod lens 41 of the center piece 44, such that the rod lens 41 and the two optical fibers 47, 48 are in a predetermined arrangement relative to each other. In the predetermined arrangement, the antireflection film 52 on the inclined face of the rod lens and the antireflection film 52 on the inclined face of the dual-core capillary 49 are parallel and face each other with a predetermined space in between.

Figure 4:
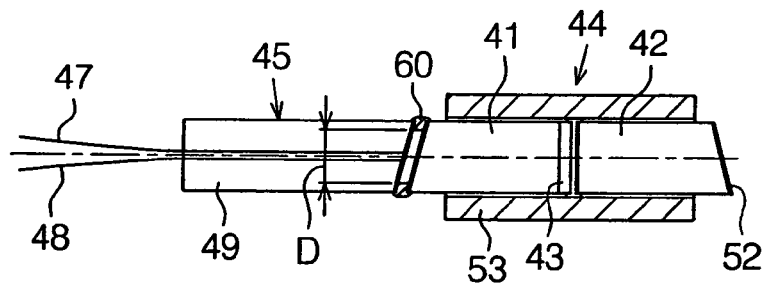
FIG. 4 is a schematic view showing a process step 3 for assembling the optical module.
Figure 5:
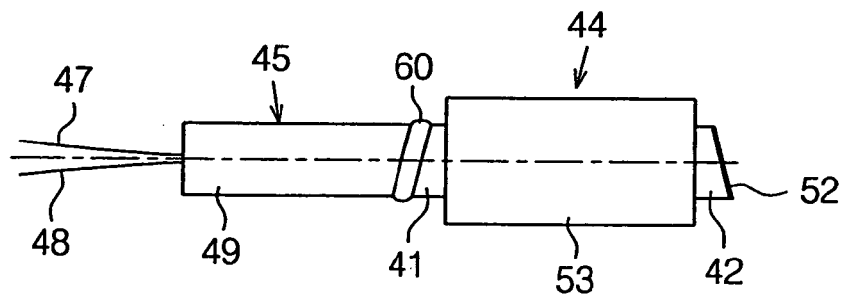
FIG. 5 is a side view showing the appearance of the optical module in the process step 3.

In process step 3, as shown in FIGS. 4 and 5, the antireflection film 52 on the inclined face of the rod lens 41 and the antireflection film 52 on the inclined face of the dual-core capillary 49 are fixed to each other with the adhesive 60 in a peripheral portion outward of the center portion used as an optical path. At this time, as shown in FIG. 4, the inner diameter D of the adhesive 60 is controlled to exceed approximately 1.0 mm.

The fixing process is performed immediately after the alignment of process step 2. That is, fixing with the adhesive 60 is executed while the rod lens 41 of the center piece 44 on the aligning device and the dual optical fiber chip 45 are kept aligned. In the fixing process, an appropriate amount of the adhesive 60 is scooped with a micro spatula. The adhesive 60 is then applied to the peripheral space between the rod lens 41 and the dual-core capillary 49 such that adhesive 60 lies over both the rod lens 41 and the dual-core capillary 49.

After applying the adhesive 60, if the adhesive 60 is an ultraviolet curing adhesive, the adhesive 60 is exposed to ultraviolet rays (center wavelength=365 nm) as necessary to be hardened.

If the adhesive 60 used in the fixing process is an ultraviolet curing adhesive or a visible light curing adhesive, the adhesive 60 must have the following characteristics.

(a) The viscosity of the adhesive 60 before being hardened must be relatively high, for example, 35000 cps, so that the adhesive 60, when applied to the peripheral portion, does not penetrate into the inner portion of the space between the rod lens 41 and the dual-core capillary 49. If the viscosity of the adhesive 60 before being hardened is low, for example, less than 35000 cps, the adhesive 60 might enter a space of 10 to 50 µm.

(b) The glass transition temperature Tg of the adhesive 60 must be higher than the usable range of temperatures of the optical module, and is preferably equal to or higher than 100° C.

Figure 6:
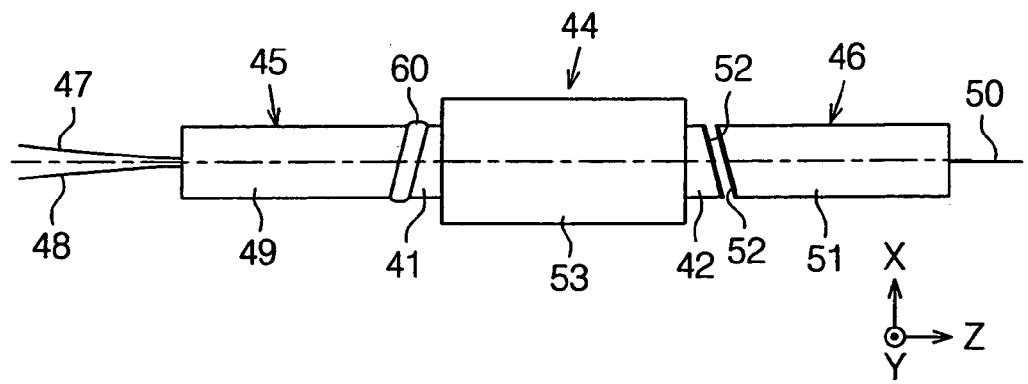
FIG. 6 is a schematic view showing a process step 4 for assembling the optical module.

In process step 4, the single optical fiber chip 46 is aligned as shown in FIG. 6 on an aligning device relative to the rod lens 42 of the center piece 44, such that the second rod lens 42 and the single optical fiber 50 are in a predetermined arrangement relative to each other.

Figure 7:
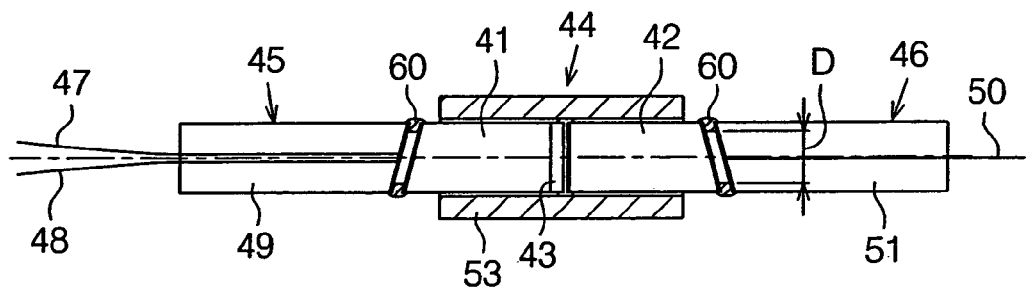
FIG. 7 is a schematic view showing a process step 5 for assembling the optical module.
Figure 8:
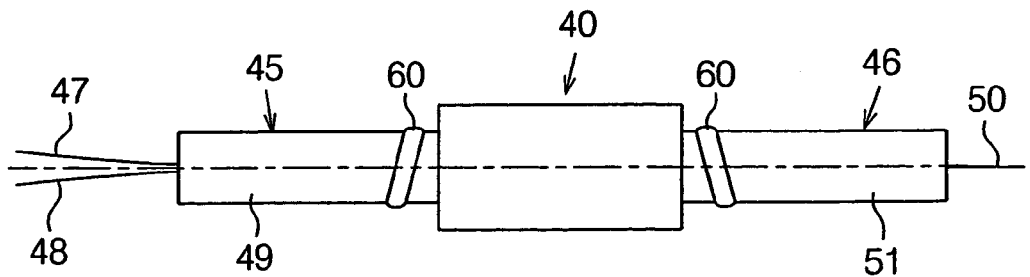
FIG. 8 is a side view showing the appearance of the optical module in the process step 5.

In process step 5, as shown in FIGS. 7 and 8, the antireflection film 52 on the inclined face of the rod lens 42 and the antireflection film 52 on the inclined face of the single-core capillary 51 are fixed to each other with the adhesive 60 in a peripheral portion outward of the center portion used as an optical path. This fixing process is performed in the same manner as process step 3. The adhesive 60 used in this fixing process must also have the properties (a) and (b) as that in process step 3.

In process step 6, at the joint of the rod lens 41 and the dual-core capillary 49, and at the joint between the rod lens 42 and the single-core capillary 51, the reinforcing adhesive 61 is applied to cover the entire circumference of the hardened adhesive 60. For example, a thermosetting epoxy adhesive is used as the reinforcing adhesive 61. After being applied, the adhesive 61 is hardened in an air of 100° C. for six hours.

The optical module 40 shown in FIG. 1(a) is thus completed. For example, when a light signal containing mixed light components with center wavelengths within the wavelength ranges λ1, λ2 enters the optical fiber 47, only the component of the center wavelength within the range λ1 passes the wavelength selective interference film 43. The passed light is condensed by the rod lens 42 and coupled with the optical fiber 50. The remainder of the light, that is, the light component of the center wavelength within the range λ2 is reflected by the interference film 43. The reflected light is condensed by the rod lens 41 and is coupled with the optical fiber 48. In this manner, an optical signal having the center wavelength within the wavelength ranges λ1, λ2 is split.

The above configured first embodiment provides the following advantages.

(1) The inclined face of the rod lens 41 and the inclined face of the dual-core capillary 49 are fixed to each other with the adhesive 60 in an peripheral portion that is outward of the center portion in which an optical path is formed.

Likewise, the inclined face of the rod lens 42 and the inclined face of the single-core capillary 51 are fixed to each other with the adhesive 60 in an peripheral portion that is outward of the center portion in which an optical path is formed. Therefore, the rod lens 41 and the dual optical fiber chip 45 are connected to each other without adhesive in the optical path. Also, the rod lens 42 and the single optical fiber chip 46 are connected to each other without adhesive in the optical path. Therefore, the adhesive 60 is not damaged by optical signals of high power, and the performance of the module is not degraded. Thus, in optical communications systems, the optical module can be applied to apparatuses using optical signals of high power and lines through which pump light of high power for an optical amplifier is transmitted. Further, since no adhesive exists in the optical paths, deterioration of optical characteristics due to adhesive is suppressed for an extended period.

(2) The adhesive 60 does not exist in the optical path between two optical parts, that is, between the rod lens 41 and the dual optical fiber chip 45, and between the rod lens 42 and the single optical fiber chip 46. Accordingly, the adhesive 60 need not be selected from adhesives having an optimal refractive index for matching the refractive indexes of two optical parts. This broadens the options of adhesive.

(3) As the adhesive 60, which is applied to the peripheral portions of optical parts, is an ultraviolet curing adhesive or a visible light curing adhesive, and the viscosity of the used adhesive is sufficiently high so that the adhesive does not penetrate inward from the peripheral portions. The time for exposing the adhesive 60 to ultraviolet or visible light to harden the adhesive 60 is no more than a few minutes. Thus, the time for fixing two optical parts with the adhesive 60 is shortened.

(4) The bonding strength of two optical parts is increased by the reinforcing adhesive 61, which increases the overall rigidity.

(5) The antireflection film 52, the reflectivity of which is less than usable wavelength by a predetermined value, is formed on each of the end faces of two optical parts. That is, the antireflection film 52 is formed on the inclined faces of the rod lens 41 and the dual-core capillary 49, and on the inclined faces of the rod lens 42 and the single-core capillary 51. This reduces the reflectivity at center portions of each end face of two optical parts, which center portions are used as optical paths.

The second embodiment will now be described. FIGS. 9(a) to 9(d) illustrate an optical module 40A according to the second embodiment.

The optical module 40A of the second embodiment is different from the optical module 40 of the first embodiment shown in FIG. 1 only in the structure of a center piece 44A.

In the optical module 40A, endfaces of the two rod lenses 41, 42 face each other with the wavelength selective interference film 43 in between. The rod lenses 41, 42 are coaxially fixed to each other with adhesives 64, 65 to form a center piece 44A.

The wavelength selective interference film 43 is formed on the endface of the first rod lens 41. The endface of the second rod lens 42 and the wavelength selective interference film 43 are fixed to each other with the adhesive 64 in the peripheral portions. Specifically, portions outward of the optical path are fixed to each other with the adhesive 64.

Further, the two rod lenses 41, 42 are fixed with the reinforcing adhesive 65 covering the entire circumference of the adhesive 64. The adhesive 64 is the same as the adhesive 60, and the adhesive 65 is the same as the adhesive 61.

In addition to the advantages (1) to (5), the second embodiment provides the following advantages.

The second embodiment provides an optical module that can be used in a center piece type filter module that does not use a cylindrical lens holder. Specifically, the optical module of the second embodiment may be applied to an optical demultiplexer/multiplexer that is used in an apparatuses using optical signals of high power of an optical communications system or in lines through which pump light of high power for an optical amplifier is transmitted.

Since a cylindrical lens holder is not used in the center piece 44A, the number of parts is reduced. This lowers the cost of the optical module.

Forming the wavelength selective interference film 43 on the endface of the rod lens 41 facilitates the manufacture of the center piece 44A.

Since the endface of the second rod lens 42 that is perpendicular to the optical axis and the wavelength selective interference film 43 are adhered to each other at peripheral portions outward of the center portion used as an optical path, the two rod lenses 41, 42 are fixed to each other without adhesive in the optical path.

The bonding strength of the two rod lenses 41, 42 is increased by the reinforcing adhesive 65, which increases the rigidity of the center piece 44A.

The third embodiment will now be described.

FIGS. 10(a), 10(b), 10(c) illustrate an optical module 40B according to the third embodiment.

The optical module 40B has a housing 70 for accommodating the main body of an optical module, for example, the optical module 40 of the first embodiment.

The housing 70 is a cylindrical body having lids 74, 75 at the left and right ends. An accommodation space 71 for the optical module 40 is defined in the housing 70. The lids 74, 75 have through holes 72, 73 through which an optical fiber extends, respectively. The housing 70 is formed with a resin lower half 80 and a resin upper half 90. The circumference of distal portions of the lid 74, 75 have a circular cross-section. Heat-shrinkable tubes 76, 77 are attached to the distal circumference of the lid 74, 75, respectively. The heat-shrinkable tubes 76, 77 are engaged with notches 78, 79 formed in the lids 74, 75, respectively, so that the heat-shrinkable tubes 76, 77 are prevented from being disengaged.

Accommodation recesses 81, 91 are formed in the halves 80, 90. When the housing is assembled, the recesses 81, 91 define the accommodation space 71. Lid pieces 82, 92 are formed in left portions of the halves 80, 90. When the housing is assembled, the lid pieces 82, 92 form the lid 74. Lid pieces 83, 93 are formed in right portions of the halves 80, 90. When the housing is assembled, the lid pieces 83, 93 form the lid 75.

An engaging piece 84 projects from a left portion of the lower half 80. The engaging piece 84 has an engaging hole 84a. An engaging piece 95 projects from a right portion of the upper half 90. The projection 94 has an engaging hole 95a. On the other hand, a projection 85 projects from a right portion of the lower half 80. The projection 85 engages with the engaging hole 95a. A projection 94 projects from a left portion of the upper half 90. The projection 94 engages with the engaging hole 84a.

A procedure for assembling the housing 70 will now be described.

As shown in FIG. 10(b), the optical module 40 is placed in the accommodation recess 81 of the lower half 80. Then, the bottom of the lens holder 53 and the inner surface of the lower half 80 are fixed to each other with adhesive 86.

Thereafter, the edges of the halves 80, 90 are brought into contact such that the optical fibers 47, 48 pass through the through hole 72 of the lid 74, and the optical fiber 50 passes through the through hole 73 of the lid 75. The halves 80, 90 are thus integrated. At this time, the engaging pieces 84, 95 of the halves 80, 90 are elastically deformed, and the projections 85, 94 of the halves 80, 90 engage with the corresponding engaging holes 95a, 84a. The housing 70 is thus assembled.

Then, the optical fibers 47, 48 and the optical fiber 50 are fixed to the through hole 72 and the through hole 73 with adhesive, respectively.

Thereafter, the heat-shrinkable tubes 76, 77 are attached to the distal circumference of the lids 74, 75, respectively. The heat-shrinkable tubes 76, 77 are engaged with the notches 78, 79. The heat-shrinkable tube 76 prevents the optical fibers 47, 48 from being bent abruptly. The heat-shrinkable tube 77 prevents the optical fiber 50 from being bent abruptly. As the material for the heat-shrinkable tubes 76, 77, for example, heat-shrinkable silicone rubber tubes are preferable because of the low cost and flexibility.

The above configured third embodiment provides the following advantages.

The optical module 40B hermetically accommodates the main body of the optical module, that is, the optical module 40, in the housing 70. Therefore, the durability of the optical module is improved.

The optical fibers 47, 48 and the optical fiber 50 are fixed to the through holes 72, 73 of the left and right lids 74, 75 of the housing 70. The optical fibers 47, 48 and the optical fiber 50 are held by the flexible heat-shrinkable tubes 76, 77, respectively, and extend outward. Therefore, the optical fibers 47, 48 and the optical fiber 50 are prevented from being bent abruptly. That is, the optical fibers 47, 48, 50 are prevented from being damaged by abrupt bending, and the performance of the optical module is maintained.

The housing 70 is formed of the resin lower half 80 and the resin upper half 90. The halves 80, 90 are formed by dividing a cylindrical body having the accommodation space 71 and the left and right lids 74, 75. The lids 74, 75 have the through holes 72, 73 for receiving optical fibers, respectively. Therefore, the housing that is inexpensive and easy to assemble is provided.

It should be apparent to those skilled in the art that the present invention may be embodied in many other specific forms without departing from the spirit or scope of the invention. Particularly, it should be understood that the invention may be embodied in the following forms.

In the first embodiment shown in FIG. 1 and the second embodiment shown in FIG. 9, the present invention is applied to three-port filter modules. However, the present invention may be applied to devices other than filter modules. That is, the present invention may be applied to optical modules having two optical parts the facing end faces of which are connected to each other with adhesive, and light is transmitted from one of the parts to the other. For example, the present invention may be applied to an optical module having minute optical elements, which are, for example, two lenses similar to gradient index lenses. Alternatively, the present invention may be applied to an optical module having a minute gradient index lens and an optical fiber.

Figure 11A:
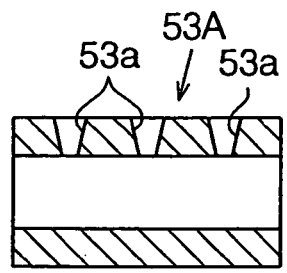
FIG. 11(a) is a cross-sectional view showing a modification of the lens holder used in the first embodiment.
Figure 11B:
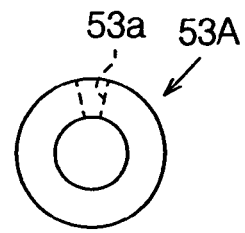
FIG. 11(b) is a side view showing the lens holder of FIG. 11(a)

In the first embodiment, the lens holder 53 may be replaced by a lens holder 53A shown in FIGS. 11(a) and 11(b). Three lateral holes 53a are formed in the circumference of the lens holder 53A. The adhesive 59 can be applied through the lateral holes 53a. This permits the rod lenses 41, 42 to be easily adhered to and fixed to the inner surface of the lens holder 53.

Figure 12A:
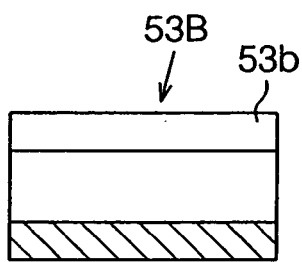
FIG. 12(a) is a cross-sectional view showing another modification of the lens holder used in the first embodiment.
Figure 12B:
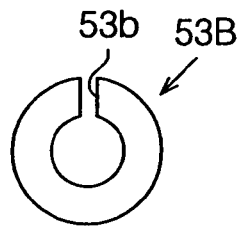
FIG. 12(b) is a side view showing the lens holder of FIG. 12(a)
Figure 13:
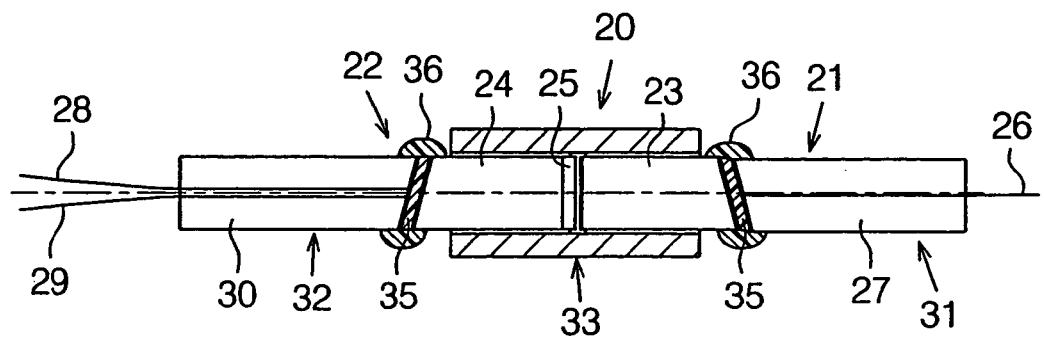
FIG. 13 is a cross-sectional view showing a prior art.

In the first embodiment, the lens holder 53 may be replaced by a lens holder 53B shown in FIGS. 12(a) and 12(b). An expanding slot 53b is formed in the circumference of the lens holder 53B along the entire axial length of the lens holder 53B. The adhesive 59 can be applied through the slot 53b. This permits the rod lenses 41, 42 to be easily adhered to and fixed to the inner surface of the lens holder 53.

In the first and second embodiments, the wavelength selective interference film 25 is used as a filter. However, the interference film may be replaced by a half mirror.

Therefore, the present examples and embodiments are to be considered as illustrative and not restrictive and the invention is not to be limited to the details given herein, but may be modified within the scope and equivalence of the appended claims.

The invention claimed is:

1. An optical module comprising:
   first and second optical parts each having an optimum path extending in a longitudinal direction and an end face intersecting the optical path, wherein the end face of the first optical part faces the end face of the second optical part, and wherein light enters the end face of the second optical part from the end face of the first optical part;
   an adhesive that forms a joint for connecting the faces of the parts to each other substantially only in peripheral portions about the optical paths of the parts; and
   wherein the joint is reinforced with an adhesive that is different from the adhesive forming the joint.

2. The optical module according to claim 1, wherein the adhesive is an ultraviolet curing adhesive or a visible light curing adhesive, and the viscosity of the adhesive is sufficiently high such that the adhesive does not penetrate toward the optical paths from the peripheral portion about the optical paths.

3. The optical module according to claim 1, wherein an antireflection film is formed on each of the end faces of the first and second optical parts, and wherein the reflectivity of each antireflection film to a predetermined wavelength in a usable wavelength region is equal to or less than predetermined value.

4. The optical module according to claim 1, wherein both of the first and second optical parts are lenses.

5. The optical module according to claim 1, wherein the first optical part is a lens, and wherein the second optical lens is an optical fiber chip.

6. The optical module according to claim 1, wherein the optical module is a three-port filter module, the filter module comprising:
   first and second lenses;
   a first optical fiber chip for holding two optical fibers, wherein the first optical fiber chip has an end face intersecting the optical fibers;
   a second optical fiber chip for holding an optical fiber, wherein the second optical fiber chip has an end face intersecting the optical fiber; and
   a filter coaxially provided between the first and second lenses,
   wherein the end face of the first lens faces the end face of the first optical fiber chip, and peripheral portions of the end faces are fixed with the adhesive, and wherein the end face of the second lens faces the end face of the second optical fiber chip, and peripheral portions of the end faces are fixed with the adhesive.

7. A three-port module comprising:

A three-port module comprising:

first and second gradient index rod lenses;

a first optical fiber chip holding two optical fibers;

a second optical fiber chip holding an optical fiber; and a Filter coaxially provided between the first and second rod lenses, wherein the first and second rod lenses are adhered to each other to form a center piece; wherein the first and second rod lenses each have an endface that is perpendicular to an optical axis, the endfaces facing each other;

wherein the filter is formed on the end face of the first rod lens, and the end face of the second rod lens and the filter are fixed with the adhesive substantially only in peripheral portions about the optical axis located between the end faces of the first rod lens and the second rod lens; and wherein the first and second rod lenses are fixed with reinforcing adhesive covering the adhesive.

8. The optical module according to claim 6, wherein the first and second lenses are gradient index rod lenses each having two endfaces, wherein one of the two endfaces is perpendicular to an optical axis, and the other endface is inclined relative to the optical axis, and wherein the endfaces of the two rod lenses face each other with the filter in between, and wherein the first and second lenses are fixed in a cylindrical lens holder while being coaxially aligned.

9. The optical module according to claim 8, wherein the filter is formed on the endface of the first rod lens.

10. The optical module according to claim 7, further comprising a housing for accommodating the optical module.

11. The optical module according to claim 10, wherein the housing has a first through hole for guiding the two optical fibers of the first optical fiber chip from the housing to the outside, and a second through hole for guiding the optical fiber of the second optical fiber chip to the outside.

12. The optical module according to claim 11, wherein the housing has first and second heat-shrinkable tubes for protecting the optical fibers guided to the outside through the first and second through holes.

13. The optical module according to claim 10, wherein the housing is formed of an upper half and a lower half, which are formed by separating the housing along the optical axis of the optical module.

14. The optical module according to claim 13, wherein the center piece is adhered to the lower half.

15. The optical module according to claim 12, wherein the housing includes an upper half and a lower half which are formed by separating the housing along the optical axis of the optical module, and wherein the center piece is adhered to the lower half of the housing.

16. The optical module according to claim 12, wherein the joint is reinforced with an adhesive that is different from the adhesive forming the joint.

17. The optical module according to claim 12, wherein the adhesive is an ultraviolet or visible light curing adhesive.

* * * * *

UNITED STATES PATENT AND TRADEMARK OFFICE
CERTIFICATE OF CORRECTION

PATENT NO. : 7,046,877 B2
APPLICATION NO. : 10/703871
DATED : May 16, 2006
INVENTOR(S) : Tanaka et al.

It is certified that error appears in the above-identified patent and that said Letters Patent is hereby corrected as shown below:

IN THE CLAIMS

CLAIM 1, column 7, line 41, delete "the" and substitute therefore -- a --.

CLAIM 3, column 10, line 44, insert -- a -- after "than" and before "predetermined".

CLAIM 7, column 11, line 13, delete "endfaces" and substitute therefore -- end faces --.

Signed and Sealed this

Ninth Day of January, 2007

JON W. DUDAS
*Director of the United States Patent and Trademark Office*